(12) United States Patent
Duroux et al.

(10) Patent No.: US 6,224,220 B1
(45) Date of Patent: *May 1, 2001

(54) VEHICLE EXTERIOR REAR VIEW MIRROR

(75) Inventors: Bernard Duroux, Garancieres; Serge Courtois, Seine Port, both of (FR)

(73) Assignee: Britax Geco S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,923

(22) Filed: Feb. 11, 1998

(30) Foreign Application Priority Data

Feb. 19, 1997 (GB) .................................... 9703464
Nov. 18, 1997 (GB) .................................... 9724211

(51) Int. Cl.⁷ .................................................. G02B 7/182
(52) U.S. Cl. ............................................. 359/877; 359/872
(58) Field of Search ......................... 359/874, 849, 359/841, 877, 876, 872, 873

(56) References Cited

U.S. PATENT DOCUMENTS 3,609,014 * 9/1971 Kurz ...................................... 359/874
5,159,497 * 10/1992 Lynas ................................... 359/877

FOREIGN PATENT DOCUMENTS 2273480   6/1994   (GB) .
2295592   6/1996   (GB) .
2299561   6/1999   (GB) .

* cited by examiner

*Primary Examiner*—Cassandra Spyrou
*Assistant Examiner*—Jared Treas
(74) *Attorney, Agent, or Firm*—Warn IP Law Office (57) ABSTRACT

A rear view mirror for a vehicle has a reflective member mounted for angular movement about a pivot axis perpendicular to a plane containing both a first line and a second line. The first line bisects the angle between an incident ray and a reflection of said incident ray extending to a first end of the major axis of a vertical section through the eyellipse, and the second line bisects the angle between said incident ray and a reflection of said incident ray extending to a second end of said major axis.

4 Claims, 9 Drawing Sheets

VEHICLE EXTERIOR REAR VIEW MIRROR

FIELD

This invention relates to an exterior rear view mirror for a vehicle of the type in which the orientation of a reflective member is adjustable relative to the vehicle. The invention is particularly, but not exclusively, applicable to mirrors of the above type in which the adjustment is performed using an electrically powered system.

RELATED ART

Legal regulations specify that a vehicle exterior mirror must provide a driver of the vehicle with a prescribed field of view. To facilitate adjustment of the field of view to suit a particular driver, it has become customary to provide exterior mirrors with means for adjusting the orientation of the reflective member thereof from within the vehicle. Where such adjustment is performed using an electrically powered mechanism, it has been customary to provide two electric motors, one for adjusting the orientation about a vertical axis and the other for adjusting the orientation about a horizontal axis.

In a motor car, the horizontal position of a driver's eyes in relation to a vehicle exterior mirror is determined principally by the length of the driver's legs since this is the factor affecting how far back the driver chooses to push his seat. The vertical distance between the mirror and the driver's eyes is determined by the length of the driver's body since this determines the height of the his eyes above his seat. Since, in the human body, leg length is not directly related to body length, there is a significant spread of possible positions for the driver's eyes. It has been found that, for the 95th percentile of the human population, these possible positions are within a zone which is of generally elliptical shape in the vertical plane. When allowance is made for the horizontal separation between the drive's two eyes and for the effect of the driver turning his head, the distribution is also somewhat elliptical in the horizontal direction.

To facilitate vehicle design, the concept of the driver's "eyellipse" has been devised to specify the overall distribution of eye position resulting from the above variations. This concept is defined in the 1988 SAE Handbook, Volume 4 "On-Highway Vehicles and Off-Highway Machinery"., Recommended Practice SAE J1050a "Describing and Measuring the Driver's Field of View", published by the Society of Automotive Engineers, Inc. It is common practice, for a motor vehicle manufacturer to use this practice to establish the location and dimensions of the eyellipse of a vehicle in relation to the required position for an exterior mirror and to supply this information to the mirror designer.

It should be understood that the term "eyellipse" does not mean that the shapes so described are necessarily true mathematical ellipses but merely that they are of generally similar shape to true mathematical ellipses.

SUMMARY OF THE INVENTION

According to a first aspect of the invention, an exterior rear view mirror for a vehicle comprises pivotal coupling means, a reflective member mounted on said pivotal coupling means which allows angular movement of the reflective member about a pivot axis perpendicular to a plane containing both a first line and a second line, wherein the first line bisects the angle between an incident ray and a reflection of said incident ray extending to a first end of the major axis of a vertical section through the eyellipse, and the second line bisects the angle between said incident ray and a reflection of said incident ray extending to a second end of said major axis.

This avoids the need to make provision for angular movement of the reflective member about a second pivot axis perpendicular to the first-mentioned pivot axis.

Preferably, the incident ray extends from the bottom corner of the required field of view closest to the vehicle.

The reflective member may be pivotally mounted in a mirror case for angular movement relative thereto about said single pivot axis. Alternatively, the reflective member may be rigidly mounted in the mirror case which is itself pivotally mounted on a bracket for angular movement relative thereto about said single pivot axis, in which event said axis also serves as the axis about which the mirror case can be displaced in the event that it is subject to impact.

According to a second aspect of the invention, an exterior rear view mirror comprises a mirror case, a reflective member, pivotal coupling means mounting the reflective member in the mirror case so as to allowing angular movement of the reflective member relative to the case, drive means coupled to the reflective member at a first location spaced from the first axis and arranged to cause angular movement of the reflective member about the first axis, and stop means arranged to abut against the reflective member at a second location spaced from both the first location and the first axis, the pivotal coupling means being resiliently coupled to the case so as to allow angular movement of the reflective member about a second axis inclined to the first axis during continued operation of the drive means following abutment of the reflective member against the stop means.

This avoids the need for separate drive means for tilting the reflective member downwardly when it is desired to provide a view of the ground immediately adjacent to the rear of the vehicle.

Preferably, the pivotal coupling means comprises a first pivot joint rigidly secured to the mirror case and a second pivot joint resiliently secured to the mirror case.

According to a third aspect of the invention, an exterior rear view mirror for a vehicle, comprises a bracket adapted to be mounted on a vehicle body, a mirror case mounted on the bracket for angular movement relative thereto, a reflective member mounted in the mirror case, an electric motor in the mirror case, and a worm wheel driven by said electric motor, the worm wheel being journaled in sprung bearings so as to be resiliently biased into engagement with a pinion which is coupled to the bracket.

DETAILED DESCRIPTION OF THE PREFERRED EMBODIMENT

Figure 1:
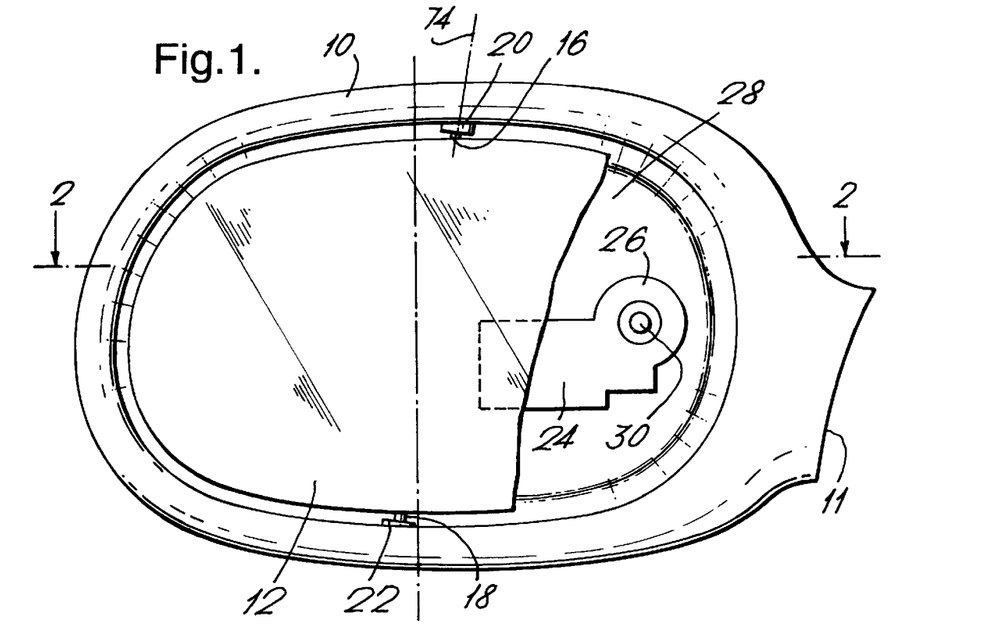
FIG. 1 is an elevational view from the rear of a vehicle, of a first embodiment of the invention with part of the mirror glass broken away.

Referring to FIG. 1, an exterior mirror has a case 10 with an inner end face 11 adapted to abut against a bracket (not shown) mounted on a motor car door. The construction of the bracket and its connection to the case 10 forms no part of the invention and will not be described further.

Figure 2:
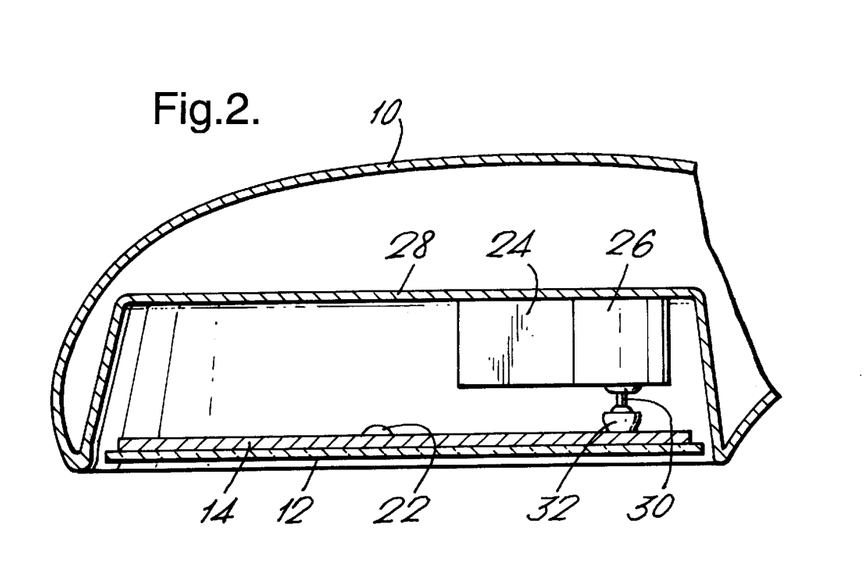
FIG. 2 is a cross-sectional view taken on the line 2—2 in FIG. 2.

Within the mirror case 10, a mirror glass 12 or other reflective member is secured to a carrier 14 which has upper and lower stub axles 16 and 18 which are journalled in respective upper and lower bearings 20 and 22 secured to the mirror case 10. A jacking screw drive comprising an electric motor 24 and gear box 26 is mounted on an internal frame member 28 of the mirror case 10. A jacking screw 30 projects from the gear box 26 and is coupled by a ball and socket joint 32 to the back of the mirror carrier 14. The jacking screw drive is as described in US-A-5331471.

Figure 3:
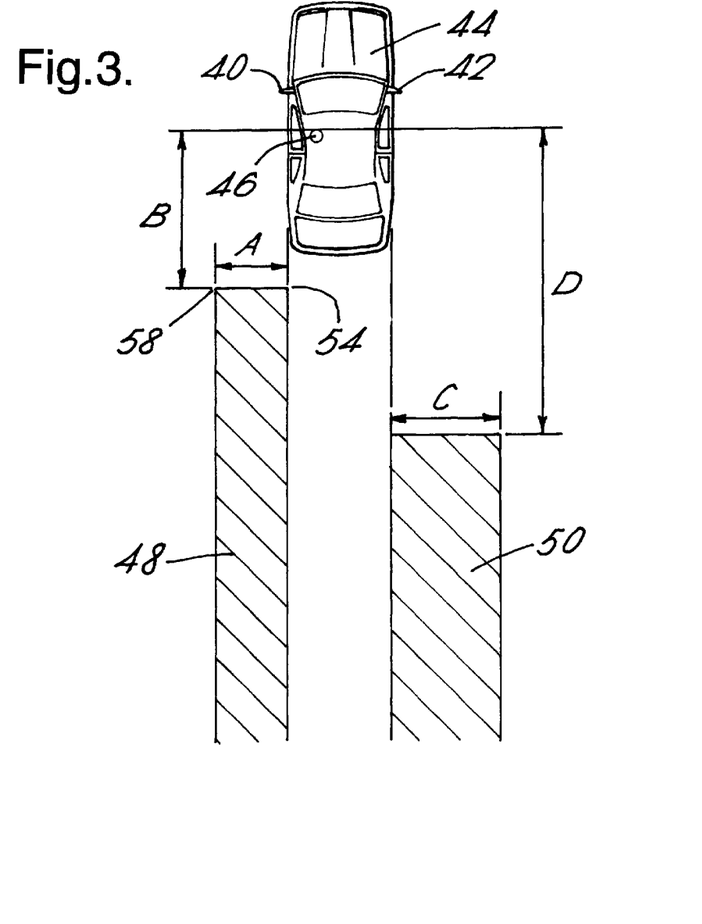
FIG. 3 is a schematic diagram illustrating the required fields of view for motor car exterior mirrors.

FIG. 3 illustrates the fields of view for the driver's side door mirror 40 and the passenger's side door mirror 42 of a motor car 44 as specified in European Regulations. The position of the driver's head is shown at 46. The driver's side door mirror 40 is required to have a field of view at ground level as indicated by the zone 48 which is of width A and starts at a distance B behind the driver's eye line. Similarly, the passenger's side door mirror 42 is required to have a field of view at ground level as indicated by zone 50 which is of width C and which begins at a distance D behind the driver's eye line. Both zones 48 and 50 extend to an indefinite distance. European Regulations specify the following dimensions:

| | |
|---|---|
| A | 2.5 meters |
| B | 10 meters |
| C | 4 meters |
| D | 20 meters |

Figure 4:
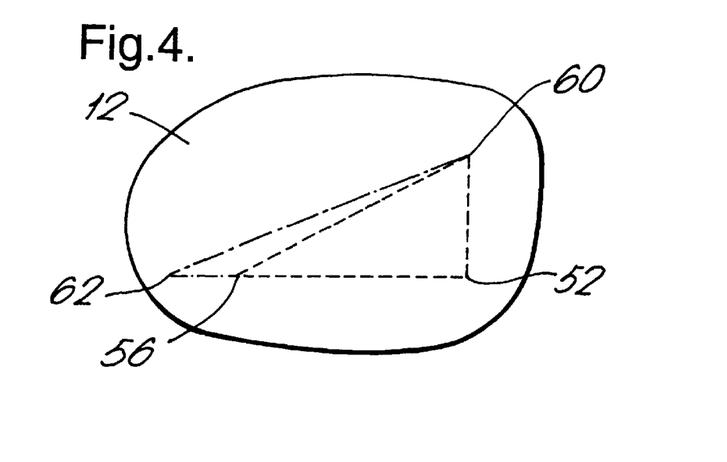
FIG. 4 is an elevational view of the reflective member of the mirror shown in FIG. 1.

The actual area of the mirror 40 required to provide this field of view for a first driver who locates his seat the furthest back of all drivers within the 95th percentile range, is illustrated by the triangle shown in dotted lines in FIG. 4. The point 52 corresponds to the inboard front corner 54 of the zone 48 (the front corner nearest to the vehicle) while the point 56 corresponds to the corner 58 on the outboard side of the front of the zone 48. The point 60 corresponds to the inboard side of this zone at the horizon. Due to perspective convergence, the outboard side of the zone 48 also appears at point 60. Light from various points along the inboard side of the zone 48 appear along the line joining the corners 52 and 60 of the triangle, while corresponding points on the outboard side of the zone 48 appear along the line joining the corners 56 and 60 of the triangle.

A second driver who locates his seat furthest forwards of all drivers within the 95th percentile range, will adjust the mirror 40 so that the inboard edge of the field of view appears on the line joining the corners 52 and 60. The point 58 will then appear to be at the point 62, forming a second triangle (shown in chain-dotted lines).

Figure 5:
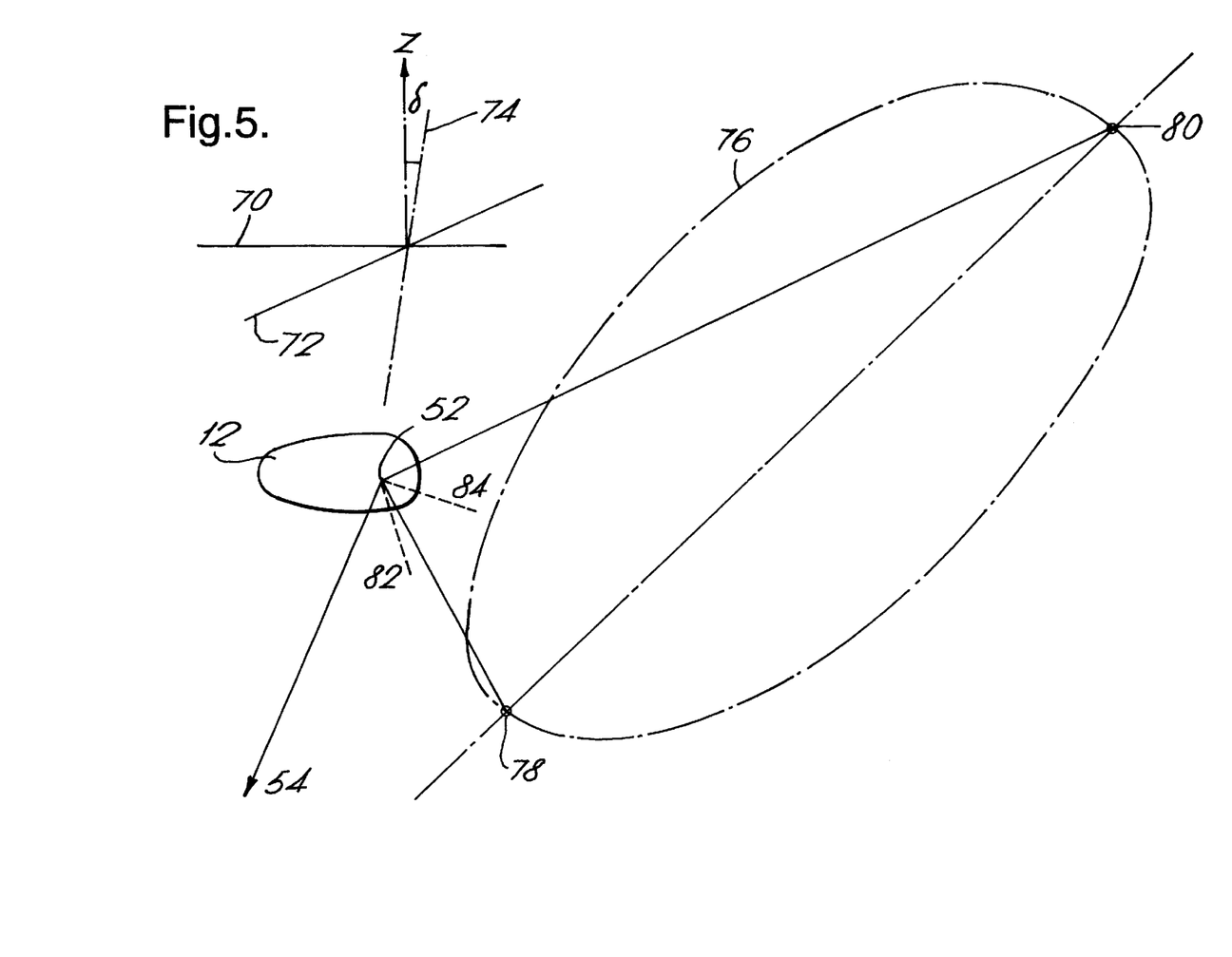
FIG. 5 is a schematic diagram illustrating the required orientation of the pivot axis of the reflective member shown in FIGS. 1 and 2.

In FIG. 5, the line 70 illustrates the plane of the mirror 12 when oriented for the first driver, the line 72 represents its plane when oriented for the second driver and the line 74 represents the axis formed by the bearings 20 and 22 (FIG. 1). 76 is a vertical cross-section through the 95th percentile eyellipse. The points 78 and 80, at the ends of the major axis of the eyellipse, are the eye locations of the first and second drivers mentioned above. The line 52-82 is the bisector of the angle between the incident ray 54-52 and the corresponding reflected ray 52-78. The line 52-84 is the bisector of the angle between the incident ray 54-52 and the corresponding reflected ray 52-80. The axis of rotation of the mirror 12 is oriented at an angle δ to the vertical Z such that it is perpendicular to the plane containing both the line 52-82 and the line 52-84.

Figure 6:
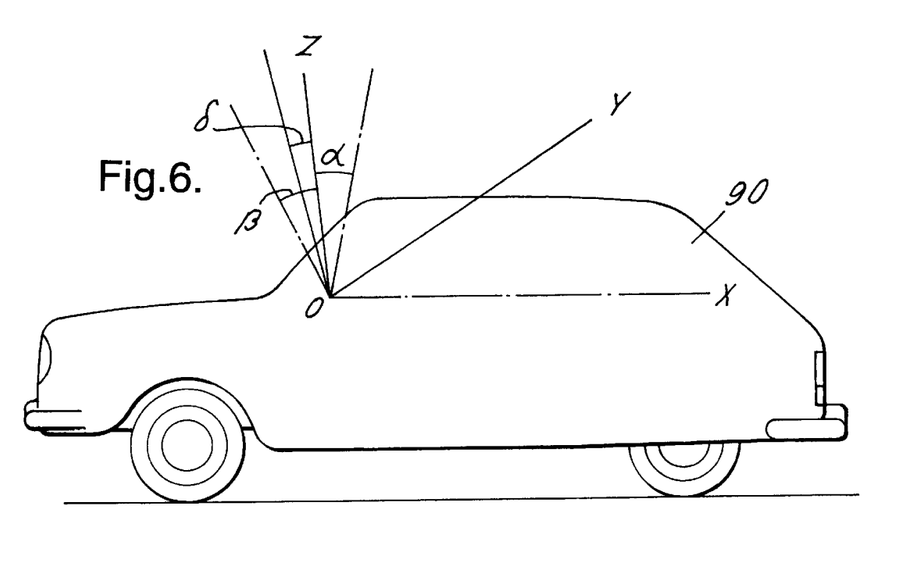
FIG. 6 is a schematic diagram showing the required orientation of said pivot axis relative to a perspective view of a car body.

As shown to FIG. 6, the angle δ can be resolved into an angular component δ in the longitudinal plane ZOX (parallel to the longitudinal central plane of the car body 90) and an angular β to the transverse plane ZOY. It has been found that the angle δ required for a relatively small car such as the Opel Corsa is very similar to that required for a larger car such as the Renault Megane. The following angles are suitable for both vehicles:

| | Driver's side | Passenger's side |
|---|---|---|
| α | −28° | 27° |
| β | 15° | 20° |

Figure 7:
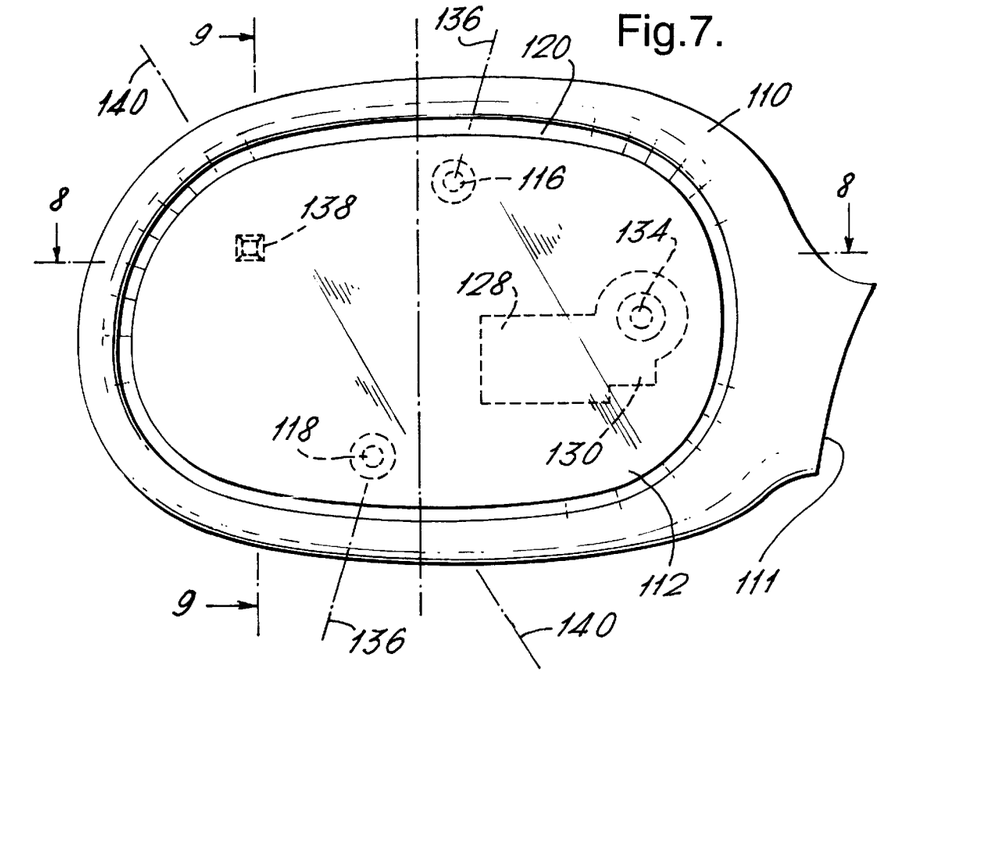
FIG. 7 is an elevational view from the rear of a vehicle, of a second embodiment of the invention.
Figure 8:
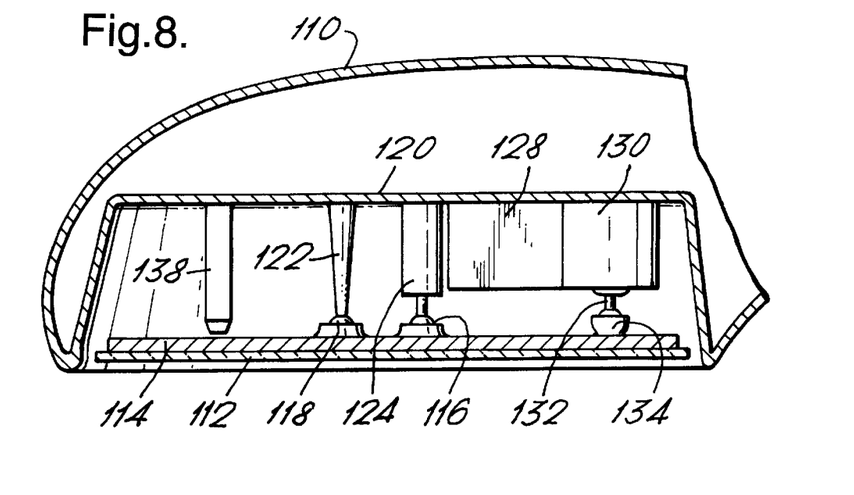
FIG. 8 is a cross-sectional view taken on the line 7—7 in FIG. 7.
Figure 9:
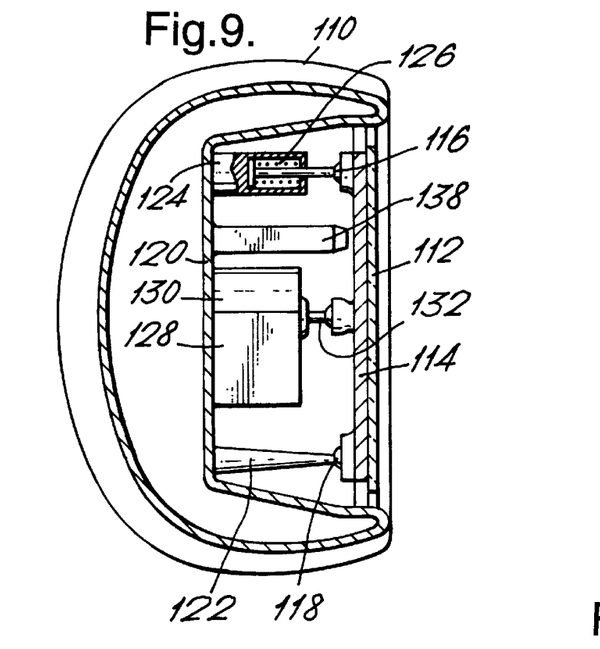
FIG. 9 is a cross-sectional view taken on the line 9—9 in FIG. 7.

FIGS. 7, 8 and 9 show an exterior mirror having a case 110 with an inner end face 111 adapted to abut against a bracket (not shown) mounted on a motor car door. Within the mirror case 110, a mirror glass 112 or other reflective member is secured to a carrier 114 which is mounted on upper and lower ball-and-socket joints 116 and 118 which are secured to an internal frame member 120 of the mirror case 10. The lower ball-and-socket joint 118 is secured to the frame member 120 by a rigid pillar 122. As can be seen from FIG. 9, the upper ball-and-socket joint 116 is mounted on a telescopic strut 124 which incorporates a compression spring 126 biasing the strut 124 to its minimum length.

A jacking screw drive, comprising an electric motor 128 and a gear box 130, is mounted on the frame member 120. A jacking screw 132 projects from the gear box 130 and is coupled by a ball-and-socket joint 134 to the back of the mirror carrier 114 near its edge closest to the end face 111 of the case 110. In normal use, protraction and retraction of the jacking screw 132 causes the mirror carrier 114, and with it the mirror glass 112, to pivot about an axis 136 (FIG. 7) extending through the two supporting ball-and-socket joints 116 and 118. This axis is chosen to have the same orientation as the axis 74 of the mirror assembly shown in FIGS. 1–6.

Figure 10:
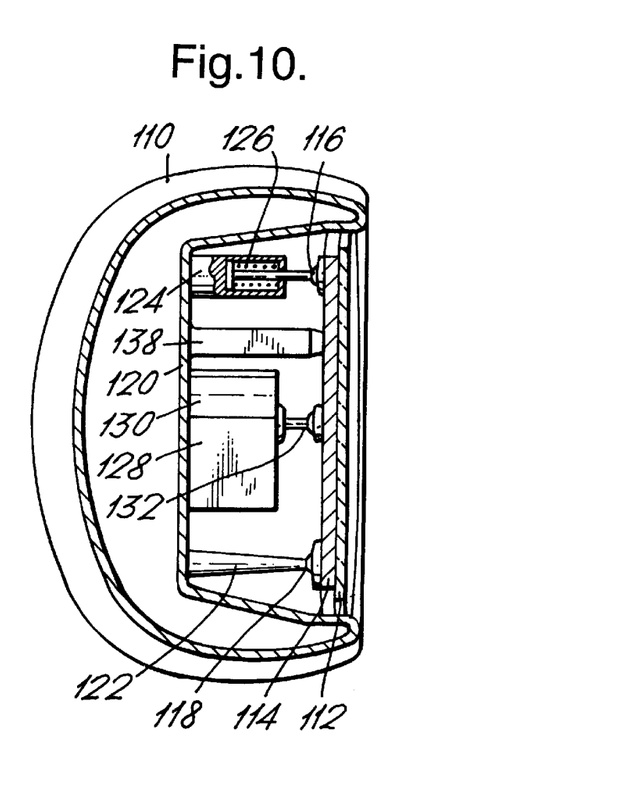
FIG. 10 is a cross-sectional view, similar to FIG. 9, but showing the mirror glass in an alternative orientation.
Figure 11:
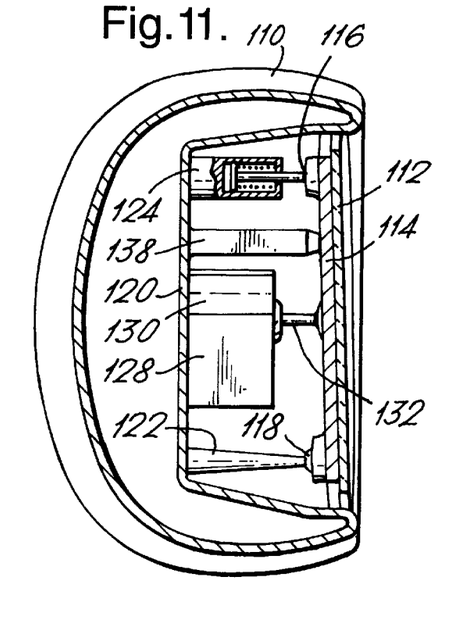
FIG. 11 is a cross-sectional view, similar to FIGS. 9 and 10, but showing the mirror glass in another alternative orientation.

An abutment stop 138 is mounted on the frame member 120 at a location near the upper corner of the mirror carrier 114 furthest from the end face 111. When the mirror carrier 114 is within its normal range of adjustment, it is out of contact with the abutment stop 138 but comes into contact therewith when reaching the outer limit of this normal range. Continued protraction of the jacking screw 132 after the mirror carrier 114 has come into abutment with the stop 138, causes elongation of the strut 124, thus compressing the spring 126. As a result, the mirror carrier 114 pivots about a second axis 140 through the lower ball-and-socket joint 118 and the abutment stop 138. This causes the mirror glass 112 to tilt downwardly so as to provide a view of the ground immediately adjacent to the rear of the vehicle. This is particularly useful when a vehicle is being reversed because it brings the ground adjacent to the rear wheels into the field of view, thus enabling the curb to be seen when the vehicle is being reversed close to the pavement.

Figure 12:
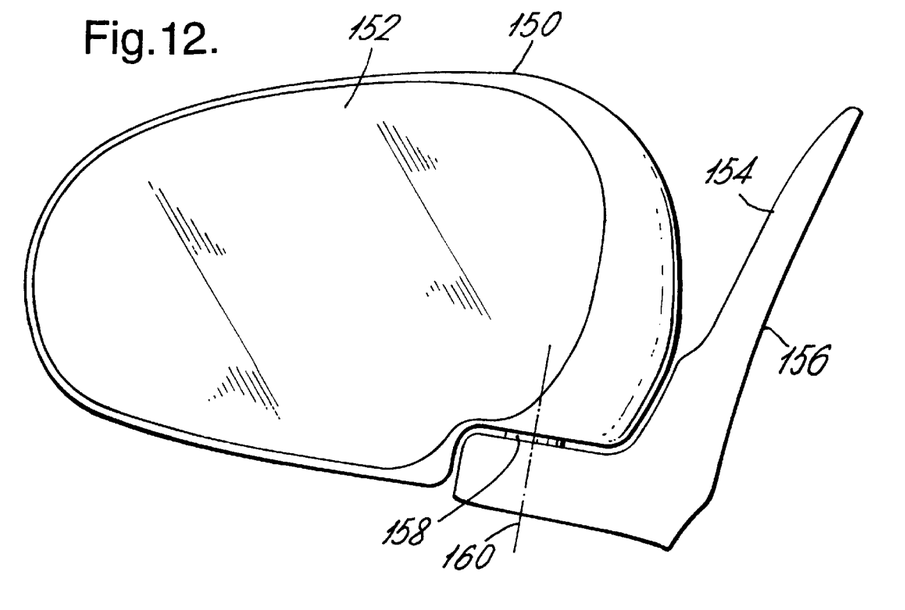
FIG. 12 is an elevational view from the rear of a vehicle, of a third embodiment of the invention.

FIG. 12 shows another exterior mirror having a mirror case 150 with a mirror glass or other reflective member 152 rigidly mounted therein. The mirror case 150 is mounted on a bracket 154 which has a mounting surface 156 adapted to abut against the body of a motor vehicle. The bracket 154 has a laterally projecting platform carrying an upwardly projecting main spigot 158 on which the case 150 is mounted for angular movement about an axis denoted by the chain dotted line 160.

Figure 13:
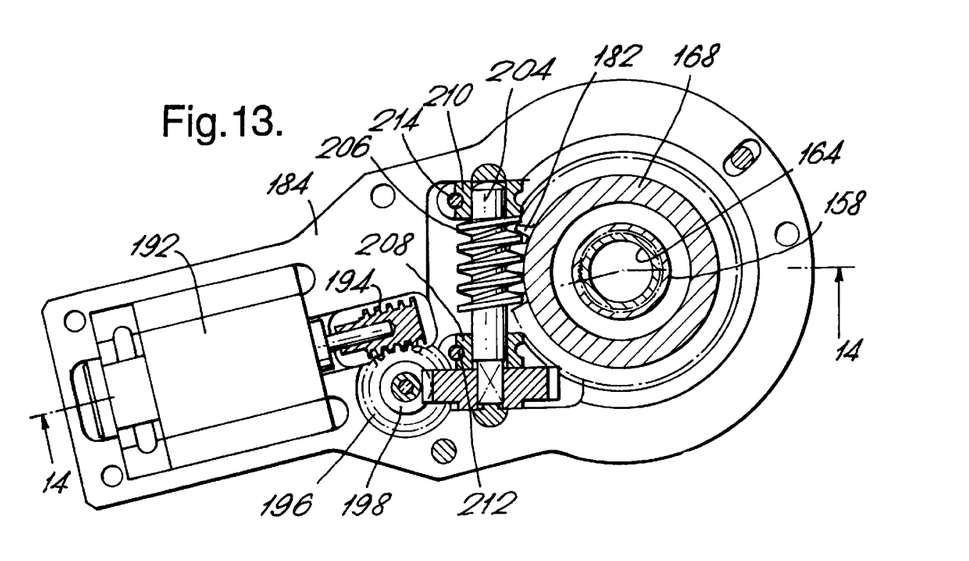
FIG. 13 is a plan view, partly in cross-section, of a motor mechanism for the mirror shown in FIG. 12 with an upper cover removed.
Figure 14:
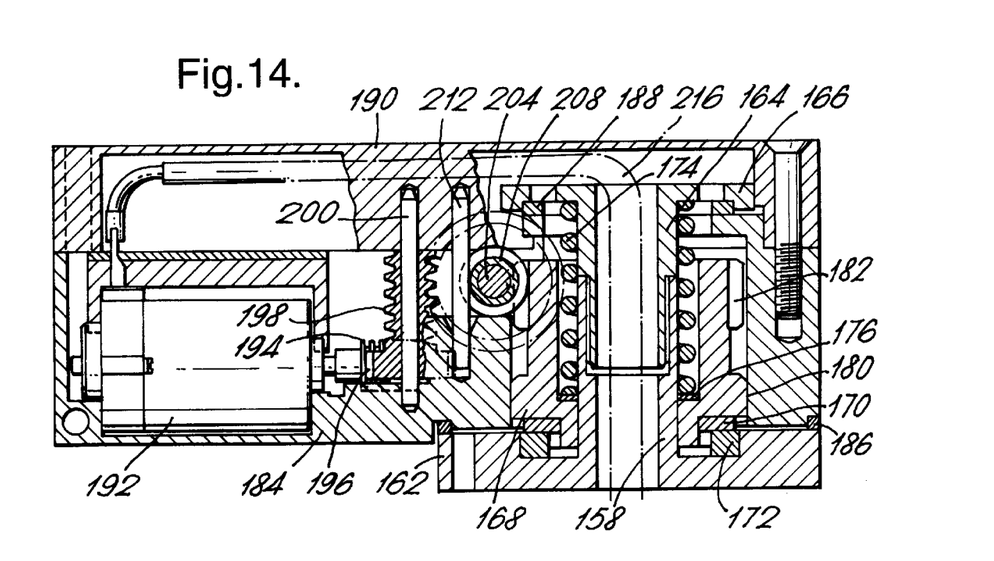
FIG. 14 is a vertical cross-sectional view taken on the line 14—14 in FIG. 13, with the upper cover in place.
Figure 15:
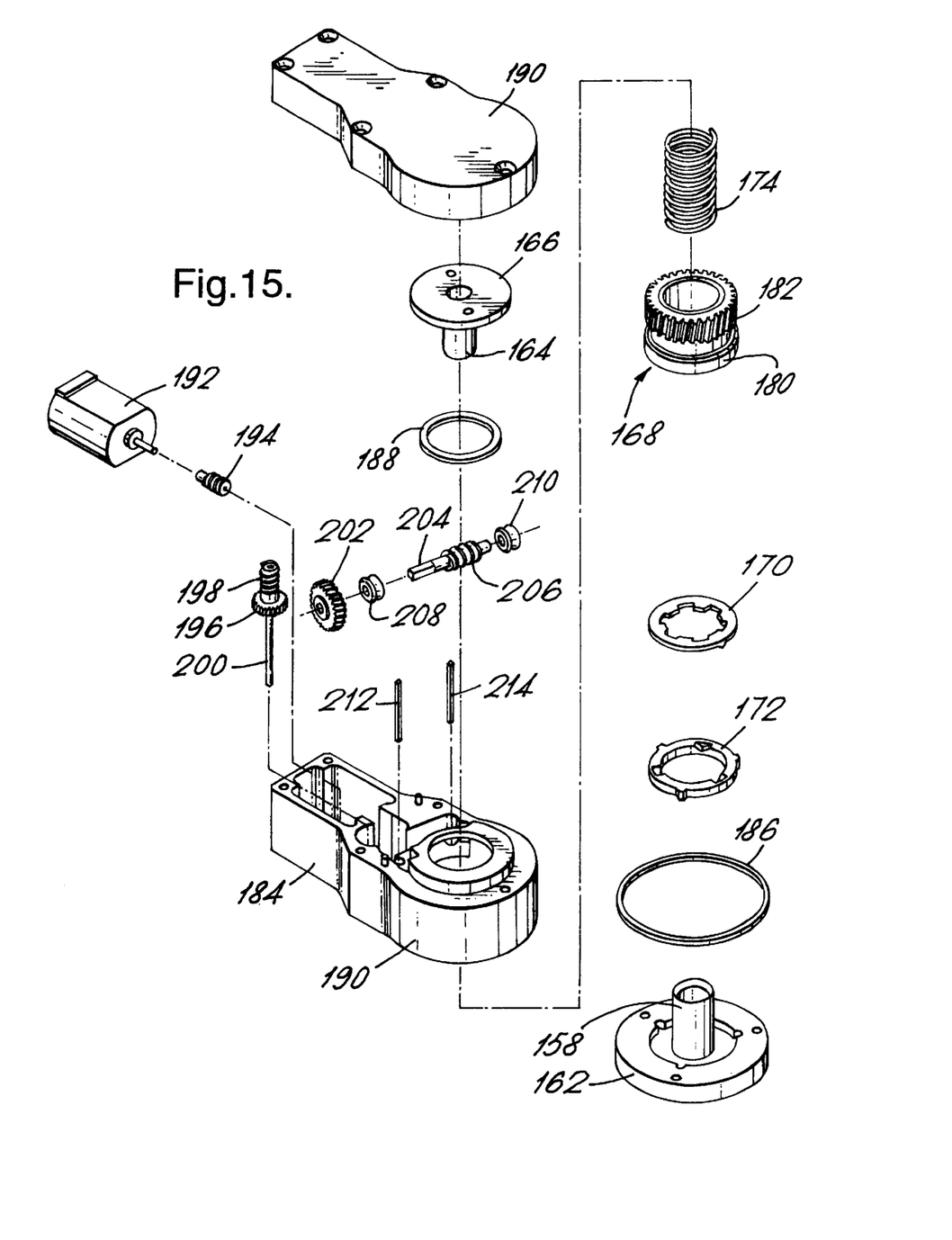
FIG. 15 is an exploded perspective view of the motor mechanism shown in FIGS. 13 and 14.

FIGS. 13, 14 and 15 show a motor mechanism for effecting this angular movement. The main spigot 158 has a flange 162 which is secured to the bracket 154 and a hollow upper end which receives a downwardly projecting stem of an upper spigot 164 which has a flange 166 on its upper end. When the mechanism is assembled, the upper spigot 164 locks in rigid engagement with the main spigot 158 so that the flanges 162 and 164 are held at a fixed distance apart from one another.

A collar 168 is journalled on the main spigot 158 and has an upper detent ring 170 secured to its bottom surface. The detent ring 170 has detent formations engaging with complimentary formations on a lower detent ring 172 which is fast with the flange 162. A compression spring 174 engages between the bottom of the flange 166 on the upper spigot 164 and an internal shoulder 176 within the collar 168 so as to urge the upper and lower detent rings 170, 172 into engagement with one another. If an excessive force tends to cause rotation of the collar 168 relative to the spigot 158, for example as a result of impact on the mirror case 150, the detent formations on the upper detent ring 170 can disengage from the complimentary formations of the lower detent ring 172 against the action of the spring 174, thus allowing relative angular movement. Arrangements of this type are common in the field of vehicle mirrors and will not be described in more detail.

The radially outer surface of the collar 168 has a smooth cylindrical lower portion 180 and a reduced diameter upper portion in the form of gear teeth 182. A mechanism housing 184, on which the mirror case 150 is mounted, is journalled on the lower portion 180 of the outer surface of the collar 168 and is supported on the flange 162 by a low-friction slip ring 186. A spring washer 188 engages between the flange 166 and a confronting surface of a lid 190 of the housing 184 so as to constrain the housing 184 against axial movement relative to the spigots 158, 164 while allowing relative angular movement. The housing 184 has a lid 190 which also covers the top of the upper spigot 164.

The housing 184 contains an electric motor 192 having a worm wheel 194 on its output shaft which engages with a pinion 196. The pinion 196 has a second worm wheel 198 fast therewith and is secured on an axle 200 which has its ends journalled in the housing 184 and the lid 190 respectively. The second worm wheel 198 engages with a second pinion 202 which is secured on a second axle 204 together with a third worm wheel 206 which in turn engages with the gear teeth 182 formed integrally with the collar 168.

The axle 204 is journalled in sliding bearings 208 and 210 which are engaged by respective spring pins 212 and 214 towards the collar 168 so as to hold the worm wheel 206 in engagement with the gear teeth 182 thereon. This arrangement ensures that no backlash can develop in the mechanism due to manufacturing tolerances and wear on the various components of the gear train. In addition, it provides resilience to absorb initial shock prior to disengagement of the detent rings 170 and 172 when the mirror case 150 is subject to impact.

An electric cable 216, for supplying the motor 192, extends from the bracket 154 through the spigots 158, 164.

What is claimed is:

1. An exterior rear view mirror for a vehicle comprising:

a case member;

a pivotal coupling arrangement provided on said case member and having a pivot axis, the pivotal coupling arrangement supporting the exterior rear view mirror within the case;

a reflective member supported by said pivotal coupling arrangement for angular movement about said pivot axis, wherein said pivotal coupling arrangement includes first and second elongated spaced interconnection members extending between said reflective member and said case, one of said first and second interconnection members being longitudinally extensible;

a single drive element operative to effect pivotal movement of said reflective member about said pivot axis;

wherein said pivotal coupling arrangement includes first and second elongated spaced interconnection members extending between said reflective member and said case, one of said first and second interconnection members being longitudinally extensible a single drive element operative to effect pivotal movement of said reflective member about said pivot axis, said pivot axis being inclined at a predetermined inclination angle relative to a vertical axis when said rear view mirror is mounted on said vehicle, said inclination angle having a first component in a plane extending perpendicular to the longitudinal axis of said vehicle and a second component extending in a plane lying parallel to the longitudinal axis of said vehicle whereby said reflective member may be pivoted about said axis by said single drive element such that said reflective member may be positioned so as to provide a view of a predetermined area lying rearwardly of said vehicle to the eyes of a vehicle operator when said eyes are positioned within a range 95th percentile eyellipse;

an abutment member provided in said case, said reflective member being pivotably moveable about said first and second interconnection members during a first range of movement, said reflective member being pivotably movable into engagement with said abutment member at one end of said first range of movement and being pivotably moveable about a second pivot axis during a second range of movement, said second pivot axis being defined by the other of said first and second interconnection members and said abutment member, wherein said second pivot axis extends at an acute included angle relative to said pivot axis.

2. A rear view mirror according to claim 1 wherein one of said case and reflective member include upper and lower bearing members and the other of said case and said reflective member include an axle arrangement, said axle arrangement extending into said upper and lower bearing members to thereby define said pivotal coupling arrangement.

3. A rear view mirror according to claim 1 wherein said first and second ranges of movement are non-overlapping.

4. A rear view mirror according to claim 1 wherein one of said first and second members is longitudinally extended during a portion of said second range of movement.

* * * * *